(12) United States Patent
Yeh et al.

(10) Patent No.: US 9,052,756 B2
(45) Date of Patent: Jun. 9, 2015

(54) ELECTROMAGNETIC WRITING UNIT AND ELECTROMAGNETIC HANDWRITING PEN FOR CONCURRENTLY PROVIDING INK WRITING AND ELECTROMAGNETIC WRITING FUNCTIONS

(71) Applicant: Wacom Co., Ltd., Saitama (JP)

(72) Inventors: Chia-Jui Yeh, Hsinchu County (TW); Chung-Hsuan Li, Hsinchu (TW)

(73) Assignee: Wacom Co., Ltd., Saitama (JP)

( * ) Notice: Subject to any disclaimer, the term of this patent is extended or adjusted under 35 U.S.C. 154(b) by 52 days.

(21) Appl. No.: 14/100,531

(22) Filed: Dec. 9, 2013

(65) Prior Publication Data

US 2015/0116287 A1 Apr. 30, 2015

(30) Foreign Application Priority Data

Oct. 25, 2013 (TW) .............................. 102138647 A

(51) Int. Cl.
*G06F 3/033* (2013.01)
*G06F 3/0354* (2013.01)
(52) U.S. Cl.
CPC .................................. *G06F 3/03545* (2013.01)
(58) Field of Classification Search
CPC .......................... G06F 3/03545; G06K 11/18

USPC ................. 345/179; 178/18.01–18.06, 19.04; 73/862.69
See application file for complete search history.

(56) References Cited

U.S. PATENT DOCUMENTS

| 4,532,376 | A | * | 7/1985 | Rockwell | .................... | 178/19.01 |
| 5,541,375 | A | * | 7/1996 | Dam et al. | .................. | 200/52 R |
| 6,252,182 | B1 | * | 6/2001 | Lai | .............................. | 178/19.04 |
| 7,643,016 | B2 | * | 1/2010 | Ake | .............................. | 345/179 |
| 2008/0257613 | A1 | * | 10/2008 | Katsurahira | ............... | 178/19.04 |

* cited by examiner

*Primary Examiner* — Pegeman Karimi
(74) *Attorney, Agent, or Firm* — Seed IP Law Group PLLC

(57) ABSTRACT

An electromagnetic handwriting pen includes a casing unit, an ink writing unit and an electromagnetic writing unit. The ink writing unit is disposed inside the casing unit and includes an ink pen core having a pen nib. The electromagnetic writing unit is disposed inside the casing unit and includes a circuit substrate far away from the pen nib, an electricity conducting element adjacent to the circuit substrate, an elastic element insulatively disposed between the circuit substrate and the electricity conducting element, and a magnetic structure adjacent to the pen nib and electrically connected to the circuit substrate. The circuit substrate has at least two electrode portions adjacent to and facing the electricity conducting element. Whereby, when the electricity conducting element is moved to concurrently contact the at least two electrode portions, the at least two electrode portions are electrically connected with each other through the electricity conducting element.

15 Claims, 10 Drawing Sheets

P

ELECTROMAGNETIC WRITING UNIT AND ELECTROMAGNETIC HANDWRITING PEN FOR CONCURRENTLY PROVIDING INK WRITING AND ELECTROMAGNETIC WRITING FUNCTIONS

BACKGROUND OF THE INVENTION

1. Field of the Invention

The instant disclosure relates to an electromagnetic writing unit and an electromagnetic handwriting pen, and more particularly to an electromagnetic writing unit applied to an electromagnetic handwriting pen and an electromagnetic handwriting pen for concurrently providing ink writing and electromagnetic writing functions.

2. Description of Related Art

A conventional electric whiteboard is a whiteboard capable of rolling the writing surface to the backside of the conventional electric whiteboard for scanning. Users write on the conventional electric whiteboard by a conventional whiteboard pen which can output ink but cannot emit electromagnetic signals. The conventional whiteboard pen outputs ink to write on the writing surface of the conventional electric whiteboard. And then, the writing surface is rolled to the backside of the conventional electric whiteboard and scanned by a scanner on the backside of the conventional electric whiteboard. After scanning, the information written on the writing surface is stored in a memory device or printed by a printer.

However, with the development of the electric whiteboard, the electromagnetic induction technique is applied to the electric whiteboard largely and the electromagnetic whiteboard, which inputs the information written thereon by the electromagnetic induction technique and digitizes the information to be stored, is developed. The conventional whiteboard pen which writes on the electric whiteboard with ink is insufficient to use on the electromagnetic whiteboard because the electromagnetic whiteboard need to induce the electromagnetic signals for recording the positions and the moving trace of the whiteboard pen. The conventional whiteboard pen only can output ink to write on the electromagnetic whiteboard like write on the conventional electric whiteboard, but the conventional whiteboard pen cannot input the information written on the electromagnetic whiteboard into the electromagnetic whiteboard and digitize information to be stored in the electromagnetic whiteboard simultaneously when the conventional whiteboard pen outputs ink to write on the electromagnetic whiteboard. It is because the conventional whiteboard cannot emit the electromagnetic signals for the electromagnetic whiteboard to record the positions and moving trace of the conventional whiteboard pen.

Therefore, in view of foregoing drawbacks of conventional whiteboard pen, there is a need to provide an electromagnetic whiteboard pen capable of inking and digital inputting simultaneously. This electromagnetic whiteboard pen can be applied to the electromagnetic whiteboard, and when the electromagnetic whiteboard pen outputs ink to write on the electromagnetic whiteboard, the information written on the electromagnetic whiteboard is converted into the digital information to be stored simultaneously.

SUMMARY OF THE INVENTION

One aspect of the instant disclosure relates to an electromagnetic writing unit applied to an electromagnetic handwriting pen and an electromagnetic handwriting pen for concurrently providing ink writing and electromagnetic writing functions.

One of the embodiments of the instant disclosure provides an electromagnetic handwriting pen for concurrently providing ink writing and electromagnetic writing functions, comprising: a casing unit, an ink writing unit and an electromagnetic writing unit. The casing unit includes a pen-shaped casing structure. The ink writing unit includes an ink pen core disposed inside the pen-shaped casing structure and a retractile mechanism disposed inside the pen-shaped casing structure, wherein the ink pen core has a pen nib for providing ink, and the pen nib of the ink pen core is projected from or returned into the pen-shaped casing structure through the retractile mechanism. The electromagnetic writing unit is disposed inside the pen-shaped casing structure, wherein the electromagnetic writing unit includes a circuit substrate far away from the pen nib, an electricity conducting element adjacent to the circuit substrate, an elastic element insulatively disposed between the circuit substrate and the electricity conducting element, and a magnetic structure adjacent to the pen nib and electrically connected to the circuit substrate, and the circuit substrate has at least two electrode portions adjacent to the electricity conducting element and facing the electricity conducting element. Whereby, when the electricity conducting element is moved to concurrently contact the at least two electrode portions by pushing the ink pen core, the at least two electrode portions are electrically connected with each other through the electricity conducting element.

Another one of the embodiments of the instant disclosure provides an electromagnetic handwriting pen for concurrently providing ink writing and electromagnetic writing functions, comprising: a casing unit, an ink writing unit and an electromagnetic writing unit. The casing unit includes a pen-shaped casing structure, wherein the pen-shaped casing structure has a pen head portion and pen tail portion opposite to the pen head portion. The ink writing unit includes an ink pen core disposed inside the pen-shaped casing structure. The electromagnetic writing unit is disposed inside the pen-shaped casing structure, wherein the electromagnetic writing unit includes a circuit substrate adjacent to the pen tail portion, an electricity conducting element adjacent to the circuit substrate, an elastic element insulatively disposed between the circuit substrate and the electricity conducting element, and a magnetic structure adjacent to the pen head portion and electrically connected to the circuit substrate, and the circuit substrate has at least two electrode portions adjacent to the electricity conducting element and facing the electricity conducting element. Whereby, when the electricity conducting element is moved to concurrently contact the at least two electrode portions by pushing the ink pen core, the at least two electrode portions are electrically connected with each other through the electricity conducting element.

Yet another one of the embodiments of the instant disclosure provides an electromagnetic writing unit disposed inside an electromagnetic handwriting pen having a pen-shaped casing structure, the electromagnetic writing unit comprising: a circuit substrate, an electricity conducting element, an elastic element and a magnetic structure. The circuit substrate is disposed inside the pen-shaped casing structure and adjacent to a pen tail portion of the pen-shaped casing structure. The electricity conducting element is disposed inside the pen-shaped casing structure and adjacent to the circuit substrate. The elastic element is disposed inside the pen-shaped casing structure and insulatively disposed between the circuit substrate and the electricity conducting element. The magnetic structure is disposed inside the pen-shaped casing structure and adjacent to a pen head portion of the pen-shaped casing structure, wherein the magnetic structure is electrically connected to the circuit substrate, and the circuit substrate has at least two electrode portions adjacent to the electricity conducting element and facing the electricity conducting element. Whereby, when the electricity conducting element is moved to concurrently contact the at least two electrode portions, the at least two electrode portions are electrically connected with each other through the electricity conducting element.

More precisely, the at least two electrode portions are disposed on the same lateral surface of the circuit substrate, the circuit substrate has an insulative portion disposed between the at least two electrode portions, the electricity conducting element has a contacting surface facing the at least two electrode portions and a concave portion concaved inwardly from the contacting surface, and the elastic element of the electromagnetic writing unit has a first end portion disposed around the insulative portion of the circuit substrate and a second end portion received in the concave portion of the electricity conducting element.

More precisely, the electromagnetic writing unit includes a distance adjusting structure connected to the circuit substrate for adjusting a predetermined distance from the circuit substrate to the electricity conducting element, and each electrode portion of the circuit substrate has a hard metal layer disposed on the outmost layer of the electrode portion for contacting the electricity conducting element.

More precisely, the ink writing unit includes a support structure disposed inside the pen-shaped casing structure for supporting the ink pen core, a pen core seat disposed between the ink pen core and the electricity conducting element, and an elastic element disposed around the support structure.

More precisely, the support structure has at least two position limiting grooves, the pen core seat has at least two position limiting protrusions respectively received in the at least two position limiting grooves, and the ink pen core has a tail portion opposite to the pen nib and retained in the pen core seat, wherein the support structure has an outer abutting portion disposed on the outer surface of the support structure, the pen-shaped casing structure has an inner abutting portion disposed on the inner surface of the pen-shaped casing structure and corresponding to the outer abutting portion, and two opposite ends of the elastic element of the ink writing unit are respectively abutted against the outer abutting portion of the support structure and the inner abutting portion of the pen-shaped casing structure.

More precisely, the circuit substrate and the electricity conducting element of the electromagnetic writing unit are disposed on the support element, the electromagnetic writing unit includes a buffer element disposed between the pen core seat and the electricity conducting element and disposed around the electricity conducting element and a bolt passing through the support structure and connected to the circuit substrate, and a predetermined distance between the circuit substrate and the electricity conducting element is adjusted by rotating the bolt.

More precisely, the pen-shaped casing structure has a pen head portion and pen tail portion opposite to the pen head portion, and the retractile mechanism includes a pressing switch partially exposed from the pen tail portion of the pen-shaped casing structure.

More precisely, the pressing switch is pressed to move the pen nib to project from or return into the pen-shaped casing structure through the retractile mechanism, the support structure and the pen core seat in sequence, and the ink pen core is pushed to move the electricity conducting element to concurrently contact the at least two electrode portions of the circuit substrate through the pen core seat and the buffer element in sequence.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1:
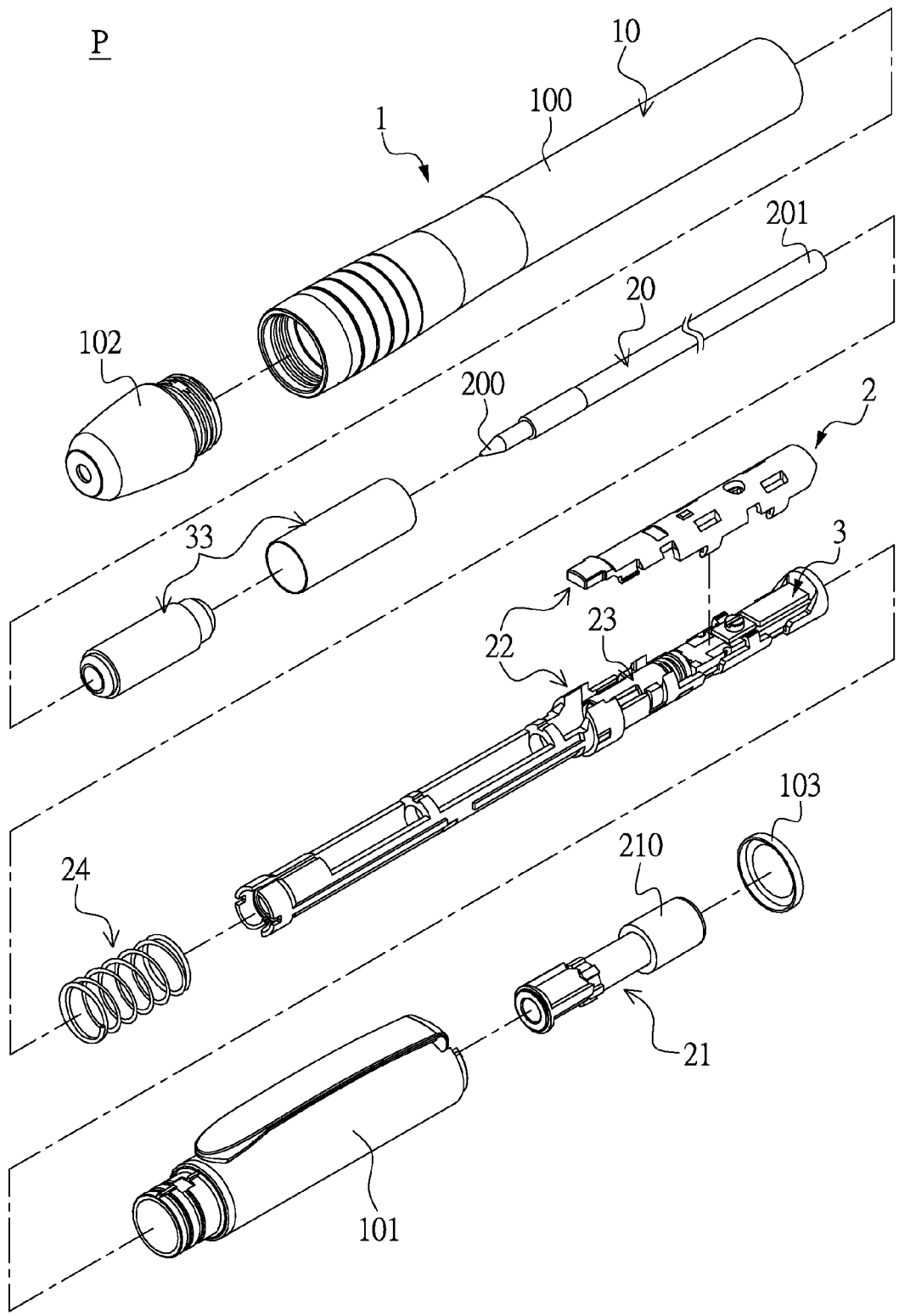
FIG. 1 shows a perspective, exploded, schematic view of the electromagnetic handwriting pen according to the instant disclosure.
Figure 2:
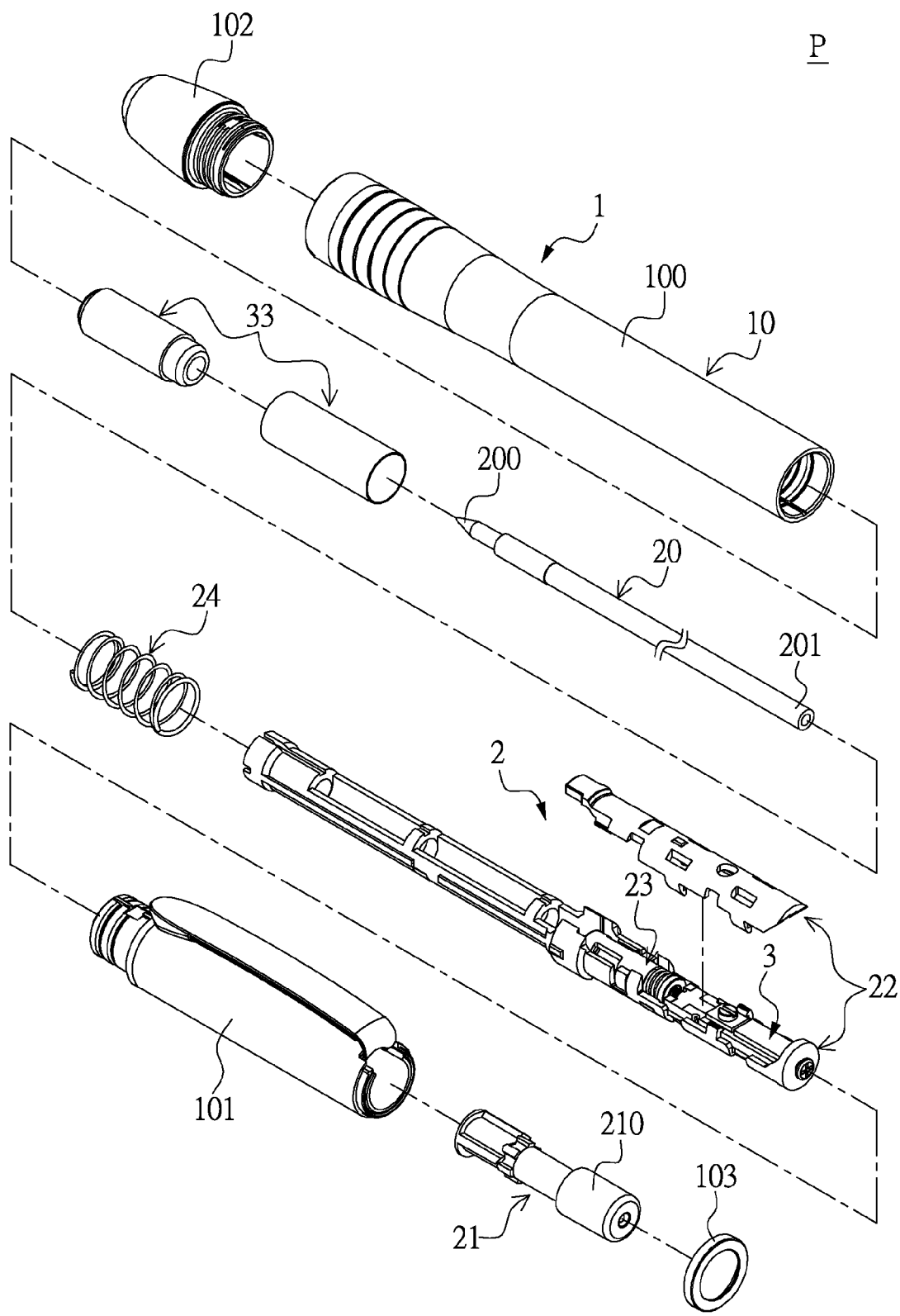
FIG. 2 shows another perspective, exploded, schematic view of the electromagnetic handwriting pen according to the instant disclosure.
Figure 3:
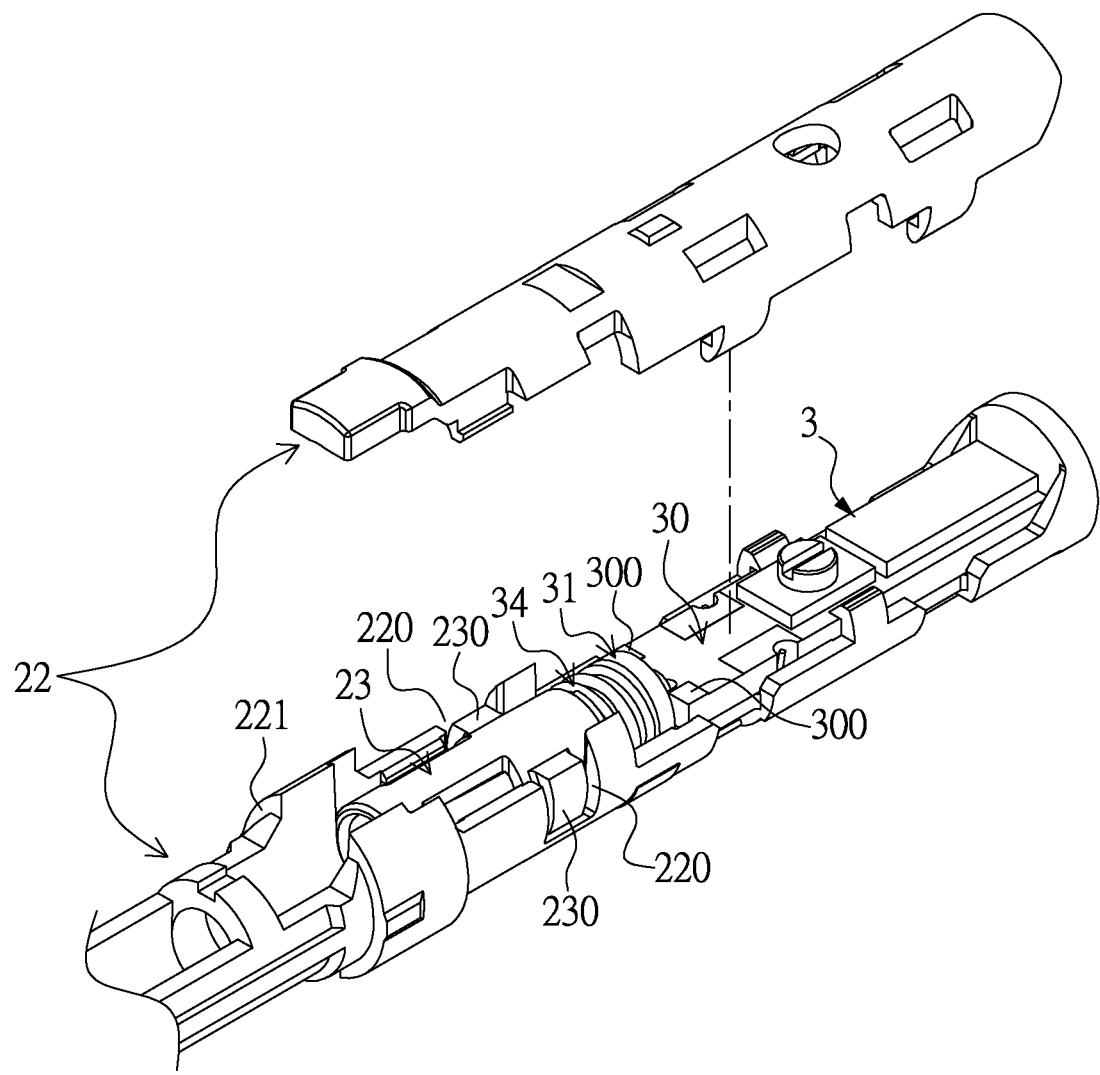
FIG. 3 shows a partial, enlarged, schematic view of FIG. 1.
Figure 4:
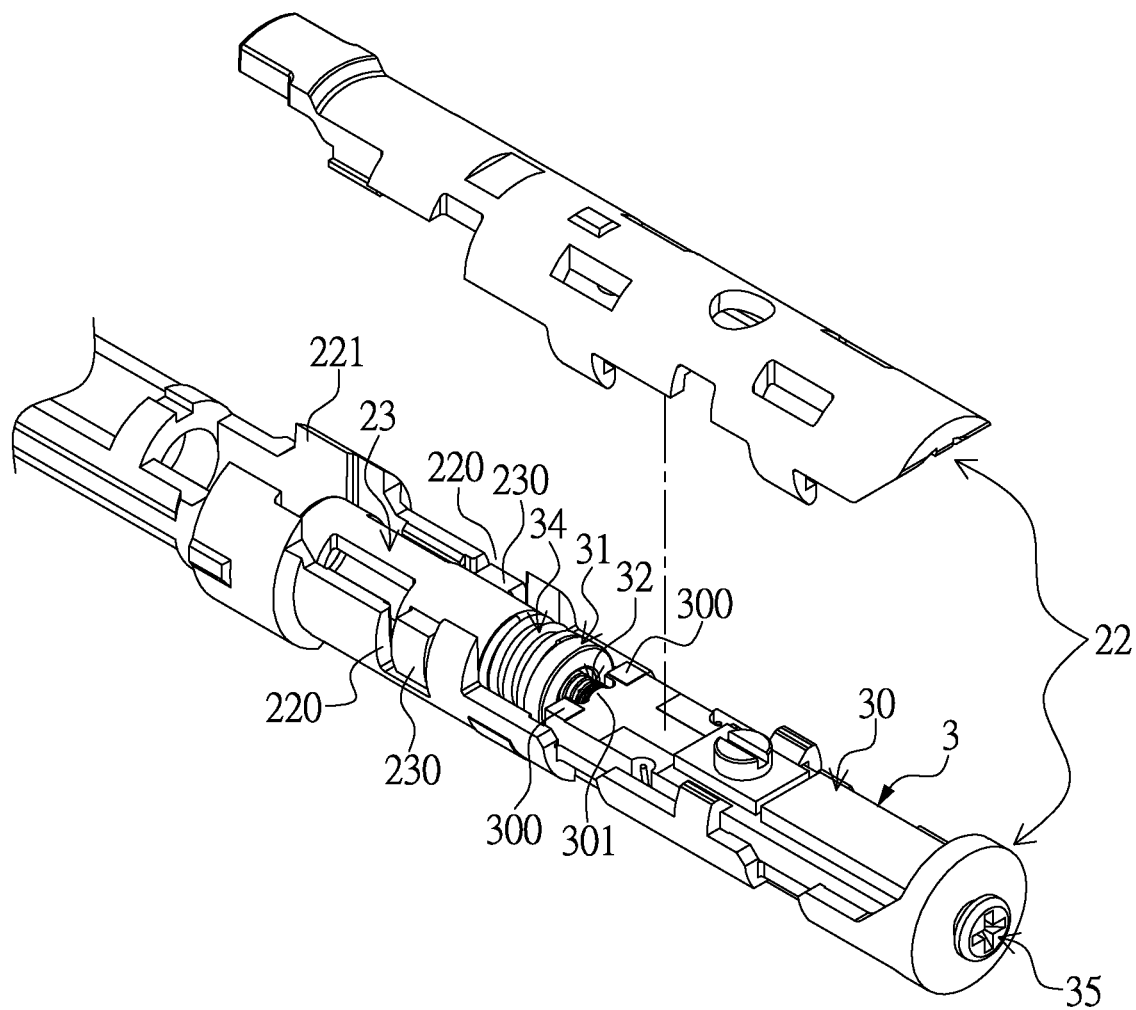
FIG. 4 shows a partial, enlarged, schematic view of FIG. 2.
Figure 5:
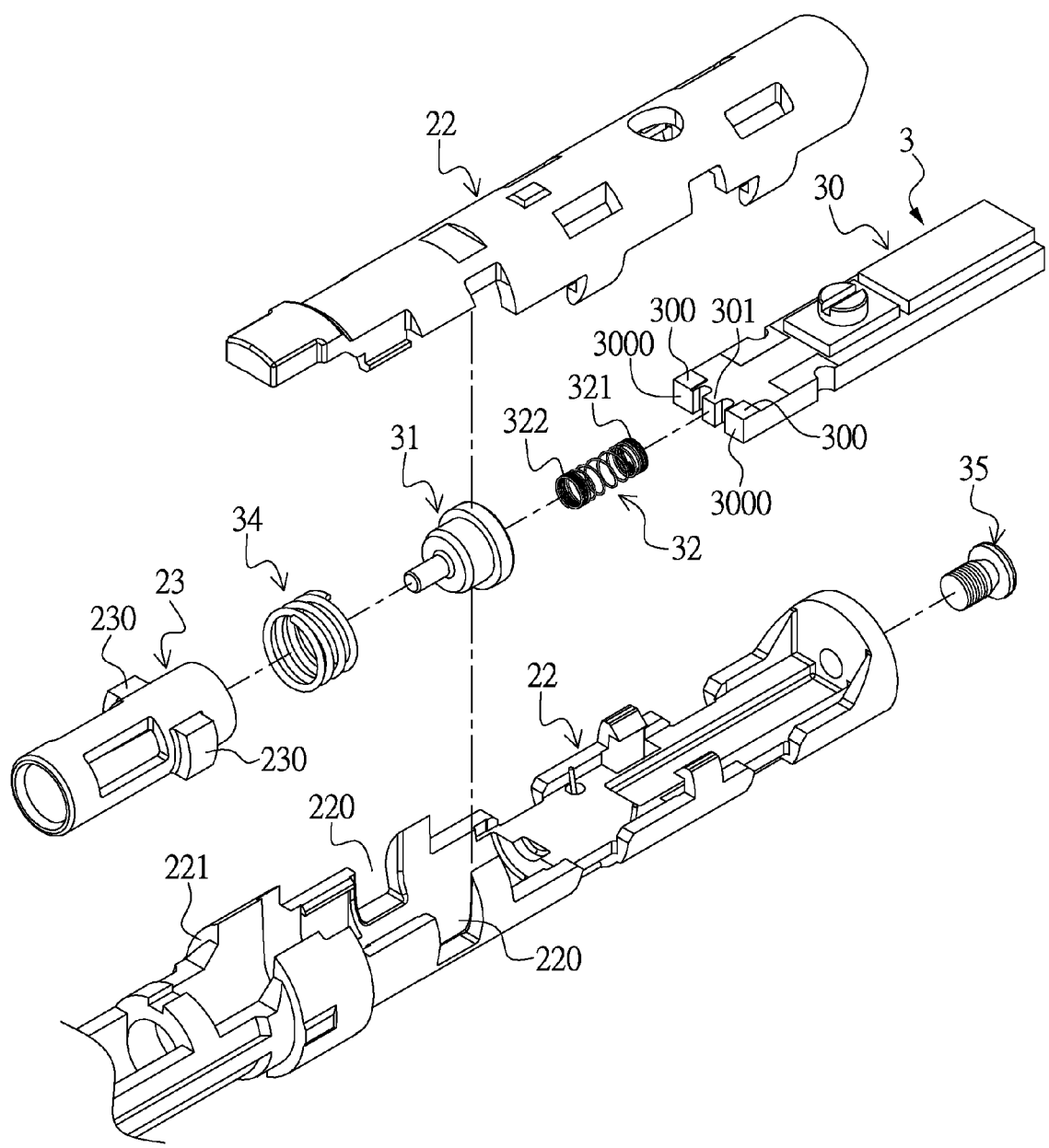
FIG. 5 shows an exploded, schematic view of FIG. 3.
Figure 6:
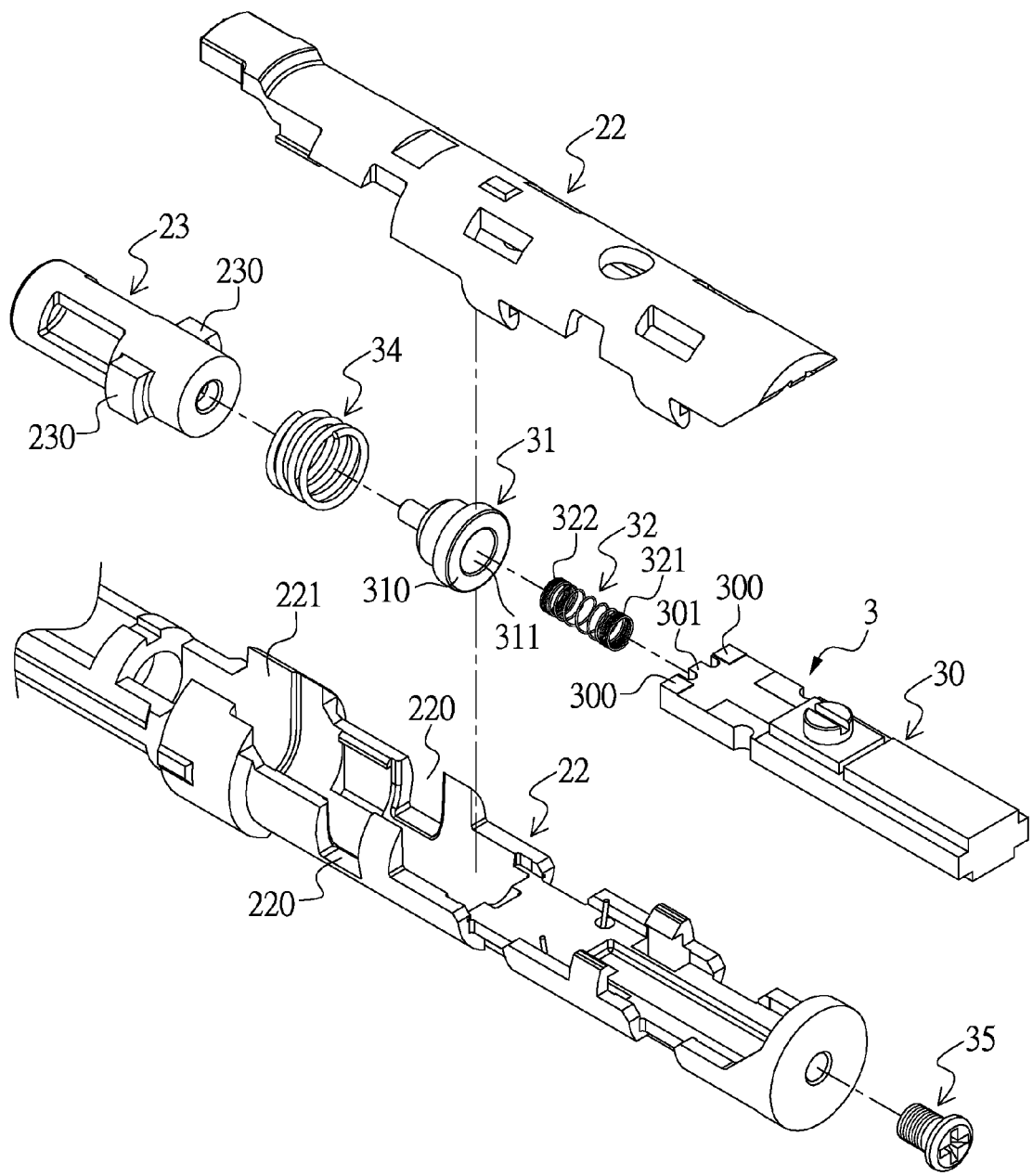
FIG. 6 shows an exploded, schematic view of FIG. 4.
Figure 7:
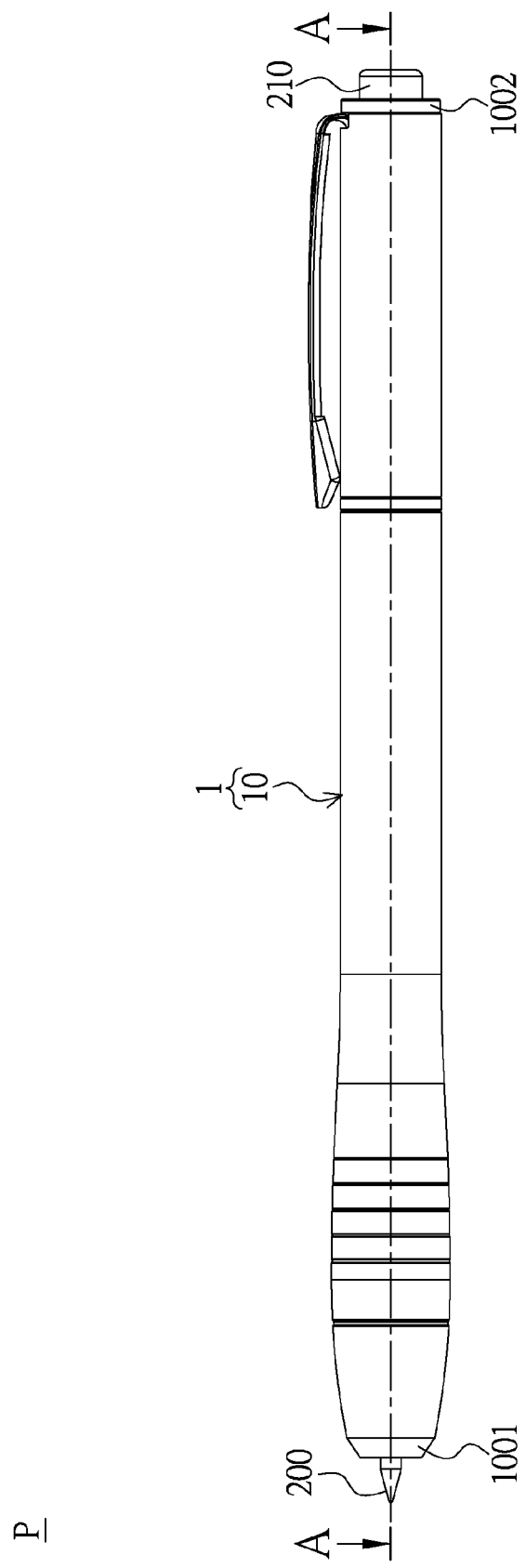
FIG. 7 shows a lateral, assembly, schematic view of the electromagnetic handwriting pen according to the instant disclosure.
Figure 8:
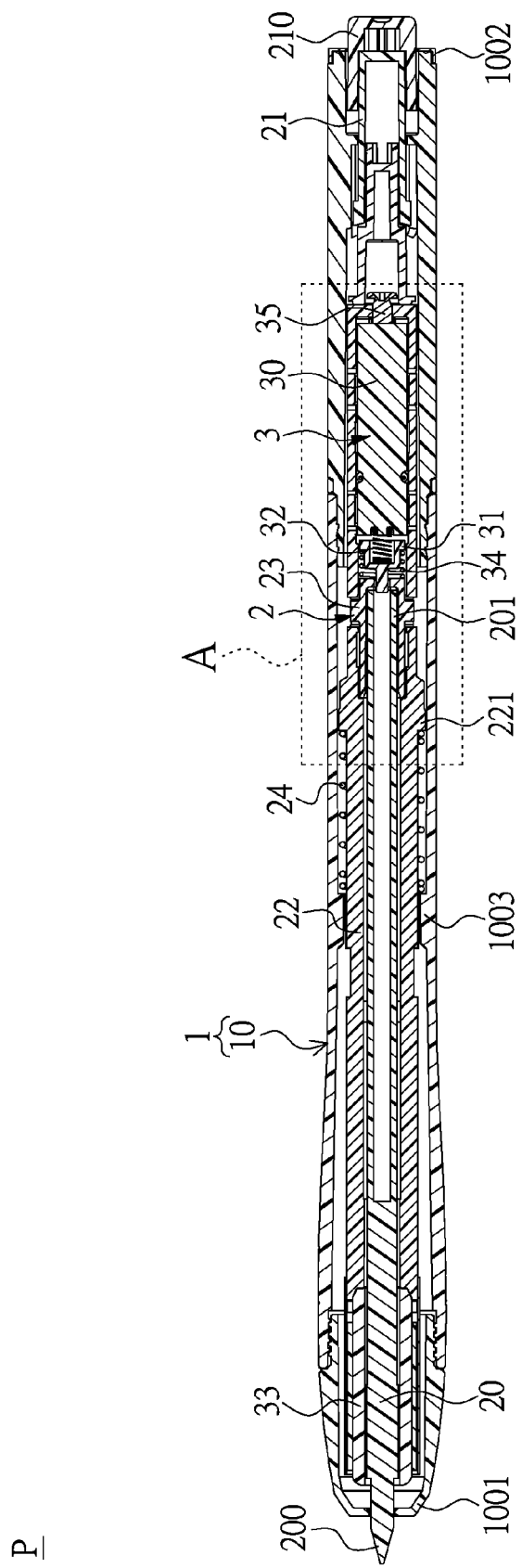
FIG. 8 shows a cross-sectional view taken along the section line A-A of FIG. 7.
Figure 9:
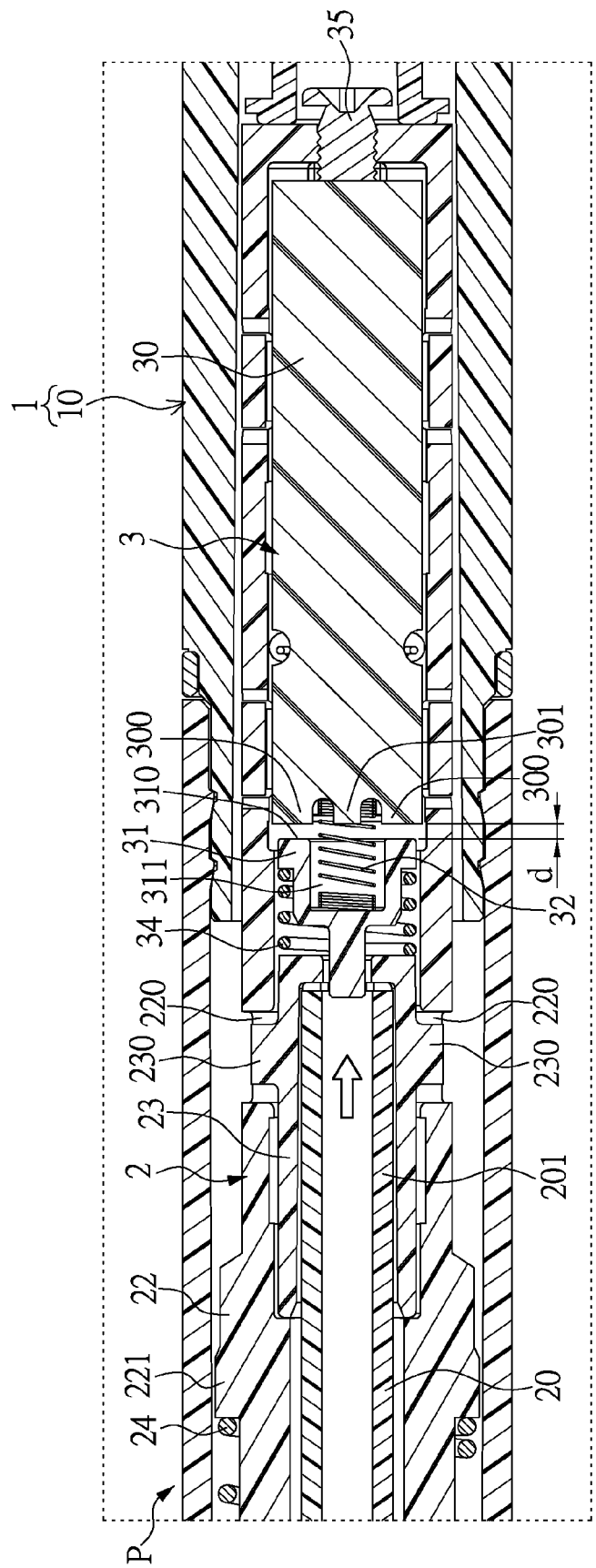
FIG. 9 shows an enlarged, schematic view taken on part A of FIG. 8.
Figure 10:
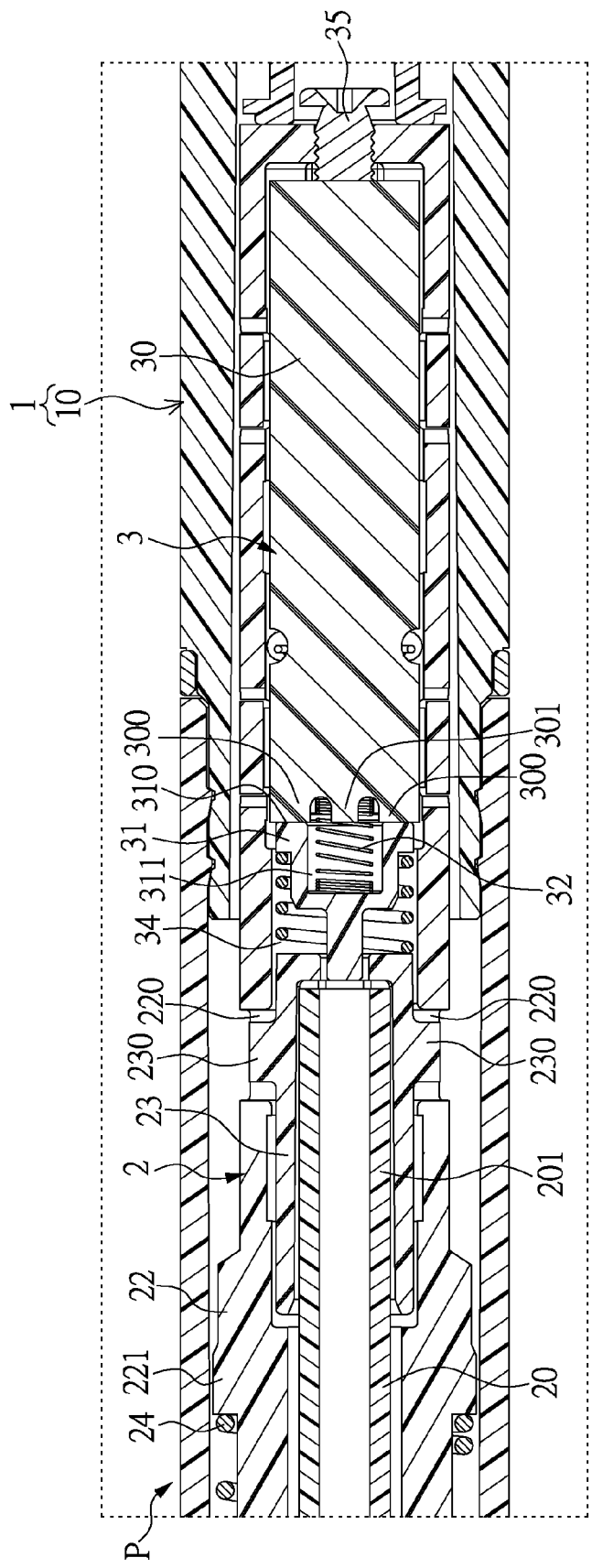
FIG. 10 shows a schematic view of the electricity conducting element concurrently contacting the at least two electrode portions in FIG. 9.

Referring to FIG. 1 to FIG. 10, FIG. 1 is a perspective, exploded, schematic diagram, FIG. 2 is another perspective, exploded, schematic diagram, FIG. 3 shows a partial, enlarged, schematic view of FIG. 1, FIG. 4 shows a partial, enlarged, schematic view of FIG. 2, FIG. 5 shows an exploded, schematic view of FIG. 3, FIG. 6 shows an exploded, schematic view of FIG. 4, FIG. 7 is a lateral, assembly, schematic diagram, FIG. 8 shows a cross-sectional view taken along the section line A-A of FIG. 7, FIG. 9 shows an enlarged, schematic view taken on part A of FIG. 8, and FIG. 10 shows a schematic view of the electricity conducting element concurrently contacting the at least two electrode portions in FIG. 9. The instant disclosure provides an electromagnetic handwriting pen P for concurrently providing ink writing and electromagnetic writing functions, comprising: a casing unit 1, an ink writing unit 2 and an electromagnetic writing unit 3.

First, referring to FIG. 1, FIG. 2 and FIG. 7, the casing unit 1 includes a pen-shaped casing structure 10, and the pen-shaped casing structure 10 has a pen head portion 1001 and pen tail portion 1002 opposite to the pen head portion 1001. For example, referring to FIG. 1 or FIG. 2, the pen-shaped casing structure 10 may be composed of a first pen casing 100, a second pen casing 101 mated with an end portion of the first pen casing 100, a pen head cover 102 mated with another end portion of the first pen casing 100, and a pen tail cover 103 mated with an end portion of the second pen casing 101. However, it is merely an example and is not meant to limit the instant disclosure.

Moreover, referring to FIG. 1, FIG. 2 and FIG. 8, the ink writing unit 2 includes an ink pen core 20 disposed inside the pen-shaped casing structure 10 and a retractile mechanism 21 (such as a push-push mechanism) disposed inside the pen-shaped casing structure 10. More precisely, the ink pen core 20 has a pen nib 200 for providing ink, and the pen nib 200 of the ink pen core 20 can be projected from the pen-shaped casing structure 10 or returned into the pen-shaped casing structure 10 through the retractile mechanism 21. In other words, when the user pushes the retractile mechanism 21, the pen nib 200 of the ink pen core 20 can be projected outwardly from the pen head portion 1001 of the pen-shaped casing structure 10. Then, when the user pushes the retractile mechanism 21 again, the pen nib 200 of the ink pen core 20 can be returned inwardly into the pen head portion 1001 of the pen-shaped casing structure 10.

Furthermore, referring to FIG. 3 to FIG. 6, and FIG. 8 to FIG. 10, the electromagnetic writing unit 3 is disposed inside the pen-shaped casing structure 10. More precisely, the electromagnetic writing unit 3 includes a circuit substrate 30 far away from the pen nib 200 (or adjacent to the pen tail portion 1002 of the pen-shaped casing structure 10), an electricity conducting element 31 adjacent to the circuit substrate 30, an elastic element 32 (such as a compression spring or an elastic piece) insulatively disposed between the circuit substrate 30 and the electricity conducting element 31, and a magnetic structure 33 adjacent to the pen nib 200 (or adjacent to the pen head portion 1001 of the pen-shaped casing structure 10) and electrically connected to the circuit substrate 30 through conductive wires (not shown), and the circuit substrate 30 has at least two electrode portions 300 adjacent to the electricity conducting element 31 and facing the electricity conducting element 31. In addition, referring to FIG. 9 and FIG. 10, when the user uses the electromagnetic handwriting pen P to write on a paper, the electricity conducting element 31 is moved toward a predetermined direction (shown as the arrow in FIG. 9) to concurrently contact the at least two electrode portions 300 of the circuit substrate 30 by pushing the ink pen core 20, the at least two electrode portions 300 are electrically connected with each other through the electricity conducting element 31, thus the electromagnetic handwriting pen P can concurrently provide ink writing and electromagnetic writing functions for the user.

With regard to the ink writing unit 2, more precisely, referring to FIG. 1 to FIG. 6, and FIG. 8 to FIG. 10, the ink writing unit 2 further includes a support structure 22 disposed inside the pen-shaped casing structure 10 for supporting the ink pen core 20, a pen core seat 23 disposed between the ink pen core 20 and the electricity conducting element 31, and an elastic element 24 (such as a compression spring or an elastic piece) disposed around the support structure 22. In addition, the support structure 22 has at least two position limiting grooves 220, the pen core seat 23 has at least two position limiting protrusions 230 respectively received in the at least two position limiting grooves 220, thus the axial traveling range of the pen core seat 23 on the support structure 22 is limited by matching the at least two position limiting protrusions 230 and the at least two position limiting grooves 220. Moreover, the ink pen core 20 has a tail portion 201 opposite to the pen nib 200 and retained in the pen core seat 23, so that the tail portion 201 of the ink pen core 20 can be used to push the pen core seat 23 to move along an axial direction.

Furthermore, referring to FIG. 1, FIG. 2, and FIG. 8, the support structure 22 has an outer abutting portion 221 disposed on the outer surface of the support structure 22, the pen-shaped casing structure 10 has an inner abutting portion 1003 disposed on the inner surface of the pen-shaped casing structure 10 and corresponding to the outer abutting portion 221, and two opposite ends of the elastic element 24 of the ink writing unit 2 are respectively abutted against the outer abutting portion 221 of the support structure 22 and the inner abutting portion 1003 of the pen-shaped casing structure 10, thus the position of the elastic element 24 can be limited between the outer abutting portion 221 of the support structure 22 and the inner abutting portion 1003 of the pen-shaped casing structure 10. In addition, FIG. 7, FIG. 8, and FIG. 9, the retractile mechanism 21 includes a pressing switch 210 partially exposed from the pen tail portion 1002 of the pen-shaped casing structure 10, and the pressing switch 210 can be pressed to move the pen nib 200 of the ink pen core 20 to project from the pen-shaped casing structure 10 or return into the pen-shaped casing structure 10 through the retractile mechanism 21, the support structure 22 and the pen core seat 23 in sequence.

With regard to the electromagnetic writing unit 3, more precisely, referring to FIG. 3 to FIG. 6, FIG. 8 and FIG. 9, both the circuit substrate 30 and the electricity conducting element 31 of the electromagnetic writing unit 3 are disposed on the support element 22, the at least two electrode portions 300 are disposed on the same lateral surface of the circuit substrate 30, and the circuit substrate 30 has an insulative portion 301 disposed between the at least two electrode portions 300. For example, referring to FIG. 5, each electrode portion 300 of the circuit substrate 30 has a hard metal layer 3000 disposed on the outmost layer of the electrode portion 300 for contacting the electricity conducting element 31, and the wear resistance of the at least two electrode portions 300 can be increased by using the coating of the hard metal layer 3000. In addition, the electricity conducting element 31 has a contacting surface 310 facing the at least two electrode portions 300 and a concave portion 311 concaved inwardly from the contacting surface 310, and the elastic element 32 of the electromagnetic writing unit 3 has a first end portion 321 disposed around the insulative portion 301 of the circuit substrate 30 and a second end portion 322 received in the concave portion 311 of the electricity conducting element 31. Whereby, the elastic element 32 can help the insulative portion 301 of the circuit substrate 30 to uniformly touch the at least two electrode portions 300 of the circuit substrate 30.

Furthermore, referring to FIG. 3 to FIG. 6, FIG. 8 and FIG. 9, the electromagnetic writing unit 3 includes a distance adjusting structure connected to the circuit substrate 30 for adjusting a predetermined distance d from the circuit substrate 30 to the electricity conducting element 31. More precisely, the electromagnetic writing unit 3 includes a buffer element 34 disposed between the pen core seat 23 and the electricity conducting element 31 and disposed around the electricity conducting element 31 and a bolt 35 passing through the support structure 22 and connected to the circuit substrate 30, and a predetermined distance d between the circuit substrate 30 and the electricity conducting element 31 can be adjusted by clockwise or anticlockwise rotating the bolt 35. In addition, referring to FIG. 9, the ink pen core 20 can be pushed to move the electricity conducting element 31 to concurrently contact the at least two electrode portions 300 of the circuit substrate 30 through the pen core seat 23 and the buffer element 34 in sequence.

It is worth mentioning that the instant disclosure also provides an electromagnetic writing unit 3 disposed inside an electromagnetic handwriting pen P having a pen-shaped casing structure 10, and the electromagnetic writing unit 3 includes a circuit substrate 30, an electricity conducting element 31, an elastic element 32 and a magnetic structure 33. More precisely, the circuit substrate 30 is disposed inside the pen-shaped casing structure 10 and adjacent to a pen tail portion 1002 of the pen-shaped casing structure 10. The electricity conducting element 31 is disposed inside the pen-shaped casing structure 10 and adjacent to the circuit substrate 30, and the circuit substrate 30 has at least two electrode portions 300 adjacent to the electricity conducting element 31 and facing the electricity conducting element 31. The elastic element 32 is disposed inside the pen-shaped casing structure 10 and insulatively disposed between the circuit substrate 30 and the electricity conducting element 31. The magnetic structure 33 is disposed inside the pen-shaped casing structure 10 and adjacent to a pen head portion 1001 of the pen-shaped casing structure 10, and the magnetic structure 33 is electrically connected to the circuit substrate 30 through conductive wires (not shown). Whereby, when the electricity conducting element 31 is moved to concurrently contact the at least two electrode portions 300 of the circuit substrate 30, the at least two electrode portions 300 are electrically connected with each other through the electricity conducting element 31, thus the electromagnetic handwriting pen P can concurrently provide ink writing and electromagnetic writing functions for the user.

In conclusion, the instant disclosure provides an electromagnetic handwriting pen P includes an ink writing unit 2 for providing a ink writing function and an electromagnetic writing unit 3 for providing an electromagnetic writing function. More precisely, because the elastic element 32 is insulatively disposed between the circuit substrate 30 and the electricity conducting element 31 and the circuit substrate 30 has at least two electrode portions 300 adjacent to the electricity conducting element 31 and facing the electricity conducting element 31, when the user uses the electromagnetic handwriting pen P to write on a paper, the electricity conducting element 31 is moved toward a predetermined direction (shown as the arrow in FIG. 9) to concurrently contact the at least two electrode portions 300 of the circuit substrate 30 by pushing the ink pen core 20, the at least two electrode portions 300 are electrically connected with each other through the electricity conducting element 31, thus the electromagnetic handwriting pen P can concurrently provide ink writing and electromagnetic writing functions for the user.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An electromagnetic handwriting pen for concurrently providing ink writing and electromagnetic writing functions, comprising:
    a casing unit including a pen-shaped casing structure;
    an ink writing unit including an ink pen core disposed inside the pen-shaped casing structure and a retractile mechanism disposed inside the pen-shaped casing structure, wherein the ink pen core has a pen nib for providing ink, and the pen nib of the ink pen core is projected from or returned into the pen-shaped casing structure through the retractile mechanism; and
    an electromagnetic writing unit disposed inside the pen-shaped casing structure, wherein the electromagnetic writing unit includes a circuit substrate far away from the pen nib, an electricity conducting element adjacent to the circuit substrate, an elastic element insulatively disposed between the circuit substrate and the electricity conducting element, and a magnetic structure adjacent to the pen nib and electrically connected to the circuit substrate, and the circuit substrate has at least two electrode portions adjacent to the electricity conducting element and facing the electricity conducting element;
    wherein, when the electricity conducting element is moved to concurrently contact the at least two electrode portions by pushing the ink pen core, the at least two electrode portions are electrically connected with each other through the electricity conducting element.

2. The electromagnetic handwriting pen of claim 1, wherein the at least two electrode portions are disposed on the same lateral surface of the circuit substrate, the circuit substrate has an insulative portion disposed between the at least two electrode portions, the electricity conducting element has a contacting surface facing the at least two electrode portions and a concave portion concaved inwardly from the contacting surface, and the elastic element of the electromagnetic writing unit has a first end portion disposed around the insulative portion of the circuit substrate and a second end portion received in the concave portion of the electricity conducting element.

3. The electromagnetic handwriting pen of claim 1, wherein the electromagnetic writing unit includes a distance adjusting structure connected to the circuit substrate for adjusting a predetermined distance from the circuit substrate to the electricity conducting element, and each electrode portion of the circuit substrate has a hard metal layer disposed on the outmost layer of the electrode portion for contacting the electricity conducting element.

4. The electromagnetic handwriting pen of claim 1, wherein the ink writing unit includes a support structure disposed inside the pen-shaped casing structure for supporting the ink pen core, a pen core seat disposed between the ink pen core and the electricity conducting element, and an elastic element disposed around the support structure.

5. The electromagnetic handwriting pen of claim 4, wherein the support structure has at least two position limiting grooves, the pen core seat has at least two position limiting protrusions respectively received in the at least two position limiting grooves, and the ink pen core has a tail portion opposite to the pen nib and retained in the pen core seat, wherein the support structure has an outer abutting portion disposed on the outer surface of the support structure, the pen-shaped casing structure has an inner abutting portion disposed on the inner surface of the pen-shaped casing structure and corresponding to the outer abutting portion, and two opposite ends of the elastic element of the ink writing unit are respectively abutted against the outer abutting portion of the support structure and the inner abutting portion of the pen-shaped casing structure.

6. The electromagnetic handwriting pen of claim 4, wherein the circuit substrate and the electricity conducting element of the electromagnetic writing unit are disposed on the support element, the electromagnetic writing unit includes a buffer element disposed between the pen core seat and the electricity conducting element and disposed around the electricity conducting element and a bolt passing through the support structure and connected to the circuit substrate, and a predetermined distance between the circuit substrate and the electricity conducting element is adjusted by rotating the bolt.

7. The electromagnetic handwriting pen of claim 6, wherein the pen-shaped casing structure has a pen head portion and pen tail portion opposite to the pen head portion, and the retractile mechanism includes a pressing switch partially exposed from the pen tail portion of the pen-shaped casing structure.

8. The electromagnetic handwriting pen of claim 7, wherein the pressing switch is pressed to move the pen nib to project from or return into the pen-shaped casing structure through the retractile mechanism, the support structure and the pen core seat in sequence, and the ink pen core is pushed to move the electricity conducting element to concurrently contact the at least two electrode portions of the circuit substrate through the pen core seat and the buffer element in sequence.

9. An electromagnetic handwriting pen for concurrently providing ink writing and electromagnetic writing functions, comprising:
  a casing unit including a pen-shaped casing structure, wherein the pen-shaped casing structure has a pen head portion and pen tail portion opposite to the pen head portion;
  an ink writing unit including an ink pen core disposed inside the pen-shaped casing structure; and
  an electromagnetic writing unit disposed inside the pen-shaped casing structure, wherein the electromagnetic writing unit includes a circuit substrate adjacent to the pen tail portion, an electricity conducting element adjacent to the circuit substrate, an elastic element insulatively disposed between the circuit substrate and the electricity conducting element, and a magnetic structure adjacent to the pen head portion and electrically connected to the circuit substrate, and the circuit substrate has at least two electrode portions adjacent to the electricity conducting element and facing the electricity conducting element;
  wherein, when the electricity conducting element is moved to concurrently contact the at least two electrode portions by pushing the ink pen core, the at least two electrode portions are electrically connected with each other through the electricity conducting element.

10. The electromagnetic handwriting pen of claim 9, wherein the at least two electrode portions are disposed on the same lateral surface of the circuit substrate, the circuit substrate has an insulative portion disposed between the at least two electrode portions, the electricity conducting element has a contacting surface facing the at least two electrode portions and a concave portion concaved inwardly from the contacting surface, and the elastic element of the electromagnetic writing unit has a first end portion disposed around the insulative portion of the circuit substrate and a second end portion received in the concave portion of the electricity conducting element.

11. The electromagnetic handwriting pen of claim 9, wherein the electromagnetic writing unit includes a distance adjusting structure connected to the circuit substrate for adjusting a predetermined distance from the circuit substrate to the electricity conducting element, and each electrode portion of the circuit substrate has a hard metal layer disposed on the outmost layer of the electrode portion for contacting the electricity conducting element.

12. The electromagnetic handwriting pen of claim 9, wherein the ink writing unit includes a support structure disposed inside the pen-shaped casing structure for supporting the ink pen core, a pen core seat disposed between the ink pen core and the electricity conducting element, and an elastic element disposed around the support structure.

13. The electromagnetic handwriting pen of claim 12, wherein the support structure has at least two position limiting grooves, the pen core seat has at least two position limiting protrusions respectively received in the at least two position limiting grooves, and the ink pen core has a tail portion opposite to the pen nib and retained in the pen core seat, wherein the support structure has an outer abutting portion disposed on the outer surface of the support structure, the pen-shaped casing structure has an inner abutting portion disposed on the inner surface of the pen-shaped casing structure and corresponding to the outer abutting portion, and two opposite ends of the elastic element of the ink writing unit are respectively abutted against the outer abutting portion of the support structure and the inner abutting portion of the pen-shaped casing structure.

14. The electromagnetic handwriting pen of claim 13, wherein the circuit substrate and the electricity conducting element of the electromagnetic writing unit are disposed on the support element, the electromagnetic writing unit includes a buffer element disposed between the pen core seat and the electricity conducting element and disposed around the electricity conducting element and a bolt passing through the support structure and connected to the circuit substrate, and a predetermined distance between the circuit substrate and the electricity conducting element is adjusted by rotating the bolt.

15. An electromagnetic writing unit disposed inside an electromagnetic handwriting pen having a pen-shaped casing structure, the electromagnetic writing unit comprising:
  a circuit substrate disposed inside the pen-shaped casing structure and adjacent to a pen tail portion of the pen-shaped casing structure;
  an electricity conducting element disposed inside the pen-shaped casing structure and adjacent to the circuit substrate;
  an elastic element disposed inside the pen-shaped casing structure and insulatively disposed between the circuit substrate and the electricity conducting element; and
  a magnetic structure disposed inside the pen-shaped casing structure and adjacent to a pen head portion of the pen-shaped casing structure, wherein the magnetic structure is electrically connected to the circuit substrate, and the circuit substrate has at least two electrode portions adjacent to the electricity conducting element and facing the electricity conducting element;
  wherein, when the electricity conducting element is moved to concurrently contact the at least two electrode portions, the at least two electrode portions are electrically connected with each other through the electricity conducting element.

* * * * *